INVENTOR.
ALAN R. CRIPE

INVENTOR.
ALAN R. CRIPE

INVENTOR.
ALAN R. CRIPE

INVENTOR.
ALAN R. CRIPE

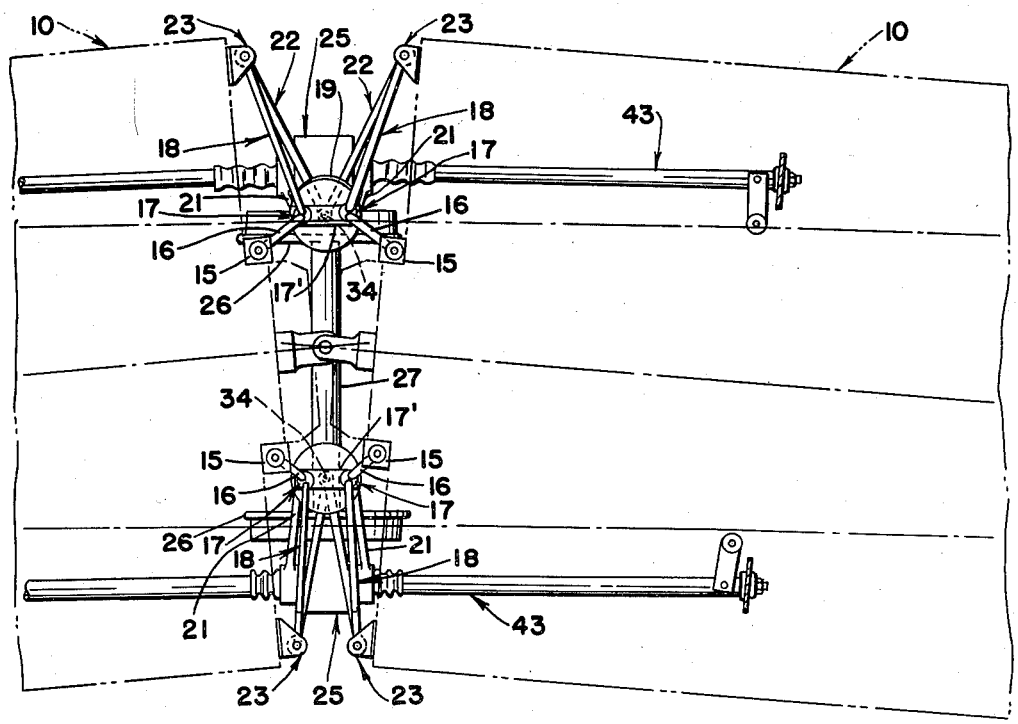
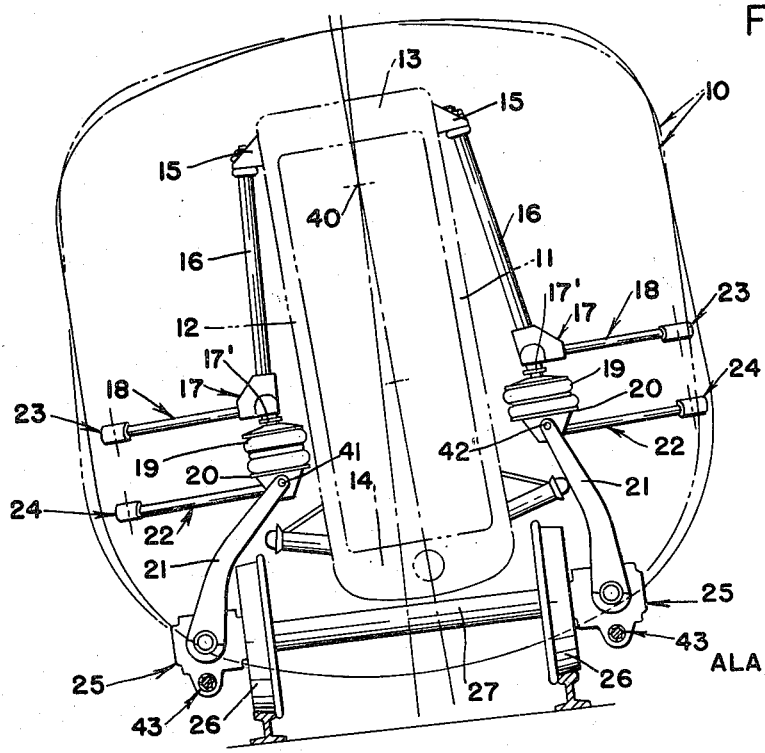
FIG. 5
FIG. 6
INVENTOR.
ALAN R. CRIPE

United States Patent Office 2,954,746
Patented Oct. 4, 1960

2,954,746

RADIALLY GUIDED, SINGLE AXLE, ABOVE CENTER OF GRAVITY SUSPENSION FOR ARTICULATED TRAINS

Alan R. Cripe, Chagrin Falls, Ohio, assignor to The Chesapeake and Ohio Railway Company, Cleveland, Ohio, a corporation of Virginia Filed Jan. 10, 1956, Ser. No. 558,241

5 Claims. (Cl. 105—4)

This invention, relating as indicated to a single axle type suspension, is particularly for articulated trains in which the axle is radially guided occupying the space between the cars, and the support is above the center of gravity providing for a pendulum type suspension.

In the general art of light-weight trains there have been numerous variations in car construction and suspension systems, but particularly there is a need to reduce the weight of the cars and the suspension system. This can be done by eliminating standard trucks, draft gear, couplers, batteries, electrical systems, air conditioning, etc. used on each car and providing a single source of electrical and air conditioning equipment and by simplifying the other components. This is necessary because half the weight of the standard car is in the trucks, electrical, air conditioning equipment and the like. Weight reduction can further be accomplished in the suspension system by the use of single axle design, tubular members and the like. This entire program can be done by employing an integrated train which is coupled together for all purposes except for major servicing. This can be done by using a suspension system between two car units and letting this have a solid rotating axle and incorporating in said suspension system a means of providing a pendulum support by having the center of gravity below the spring supports and allowing a sufficient amount of lateral freedom. These cars would be positively coupled permitting limited movement as required, with no uncoupling, and they are not designed to take the buff load through the trucks or suspension fittings. This system is further designed so that the coupler carries no vertical load but buffing loads only.

These ends have been accomplished by the use of a single axle mounted between the cars and by an above center of gravity suspension for articulated trains in which there is an axle guiding system which is guided at the top and bottom of the suspension.

In the prior developments trains, such as Talgo and Train X, similar suspension systems have been known, but it has been difficult to provide for radially guided, single axle suspension systems for these trains in which the cars were articulated and capable of bi-directional operation. Sometimes single wheels and axles were employed in light-weight trains, but these were uni-directional, and it was, of course, desirable to have bi-directional trains.

This invention particularly relates to a suspension system in which the axle is supported between two articulated cars with no freedom for longitudinal movement, but permitting articulated movement between the cars. Principally, the suspension system comprises a plurality of struts to the crash or collision posts for vertical support, a springing means, upper and lower lateral supports to the sides of the car forming equilateral wishbone structures which can permit movement between the cars in either the vertical or horizontal plane, i.e., the wishbone structures come together or move apart, and they permit a limited amount of torsion, as, for example, with relative role between cars. To support the springing means there are a pair of torsilastic arms resiliently mounted to the journal boxes to permit a limited angular movement. The torsilastic arms are adapted to move both in the same direction when going around a curve, and develop torsion in the mounting which tends to restore them to the original position. The car goes into a roll position, i.e., banks as it goes around the curve because the support is above the center of gravity, and the car acts as a pendulum about an elastic center which is not far below the roof of the car. This basic structure is different from other articulated trains, in that the suspension system is between the cars taking up less room and using the diaphragm space for the suspension system and the axle and wheels. This basic structure has a great number of advantages in permitting movement between the cars.

An object of this invention is to provide an improved suspension system for radially guided, single axle pendulum type suspensions for articulated trains.

To the accomplishment of the foregoing and related ends, said invention then consists of the means hereinafter fully described and particularly pointed out in the claims; the following description setting forth in detail one approved means of carrying out the invention, such disclosed means, however, constituting but one of the various ways in which the principles of the invention may be used.

In the drawings:

Fig. 5 is a schematic top view of the suspension system, shown going around a curve;

Fig. 6 is a schematic end view of the suspension system, showing the car body in phantom in a full roll position.

Figure 1:
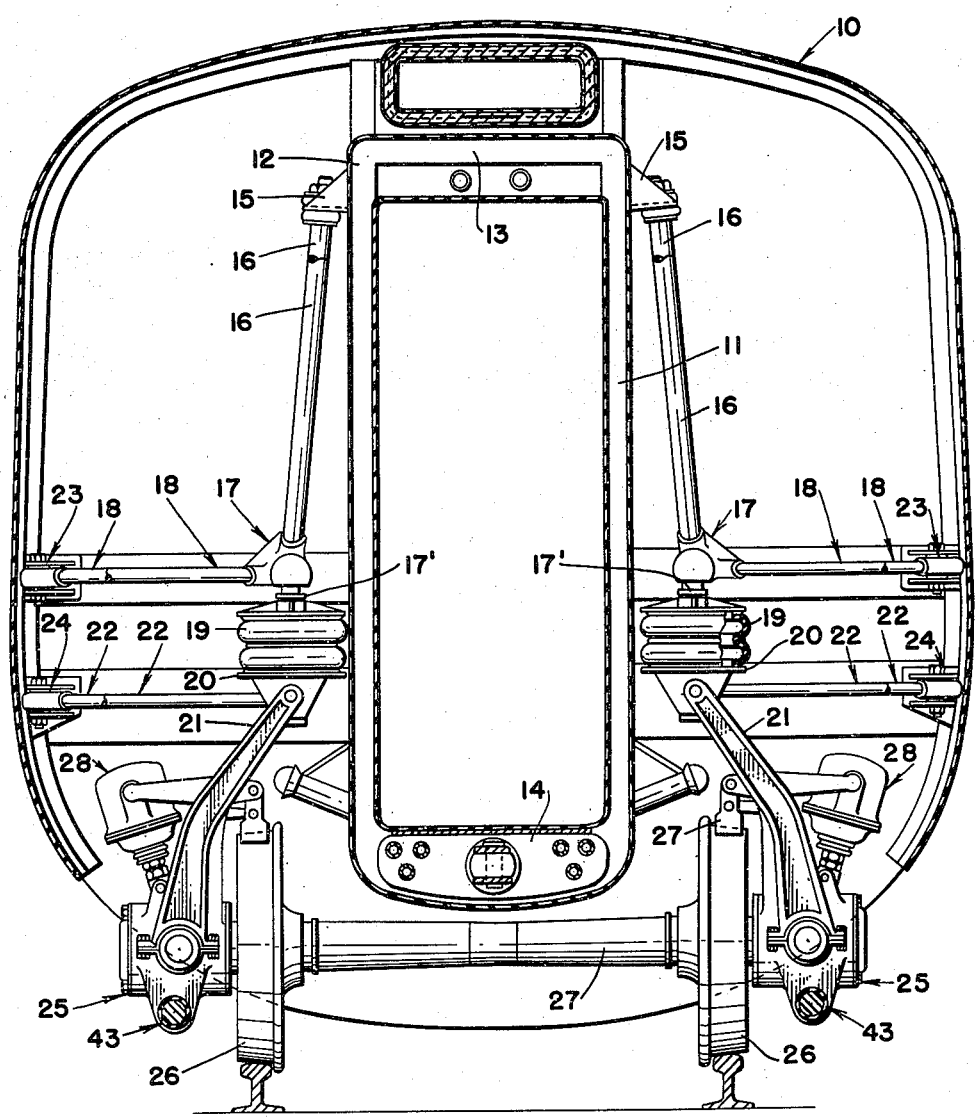
Fig. 1 is a cross-sectional view of the end of a unit of an articulated car, showing the suspension system, taken along lines 1—1 of Fig. 2.

In the drawings, 10 shows a car of the train generally that will not be described in further detail. 11 shows a vertical crash post, 12 the opposite vertical crash post and 13 the top connecting member between said crash post and 14 the lower connecting elements for the crash post, having openings for conduits and the like.

In the suspension system, 15 shows the vertical body strut mounting and 16 shows the vertical strut itself, of which there are four, two on each car, attached to the suspension system. The vertical struts are attached to an upper mounting plate and a ball unit, showing generally at 17. Said ball units are connected to two upper lateral links, shown generally at 18. The walking beam 17' is connected to an air bellows or springing means 19, though this could be a coil spring. The bellows is connected to a lower plate member 20 and to the torsilastic arms 21. Said arms are mounted in a torsion unit and are adapted to rotate, and then resume their normal position. The mounting plate 20 is connected to two lower lateral links shown generally at 22. Said lower and upper lateral links are connected to the car body 10 by means of lateral link mountings. Said upper lateral link mountings are shown generally at 23 and said lower lateral link mountings are shown generally at 24. The torsilastic arms 21 are connected to the radially guided axle and to the journal assembly shown generally at 25.

The wheel 26 would be connected to the axle 27, and to an identical assembly on the opposite side.

The brake assembly shown generally at 28 and brake shoe 29 are not a part of the suspension system per se and need not be further described.

Figure 2:
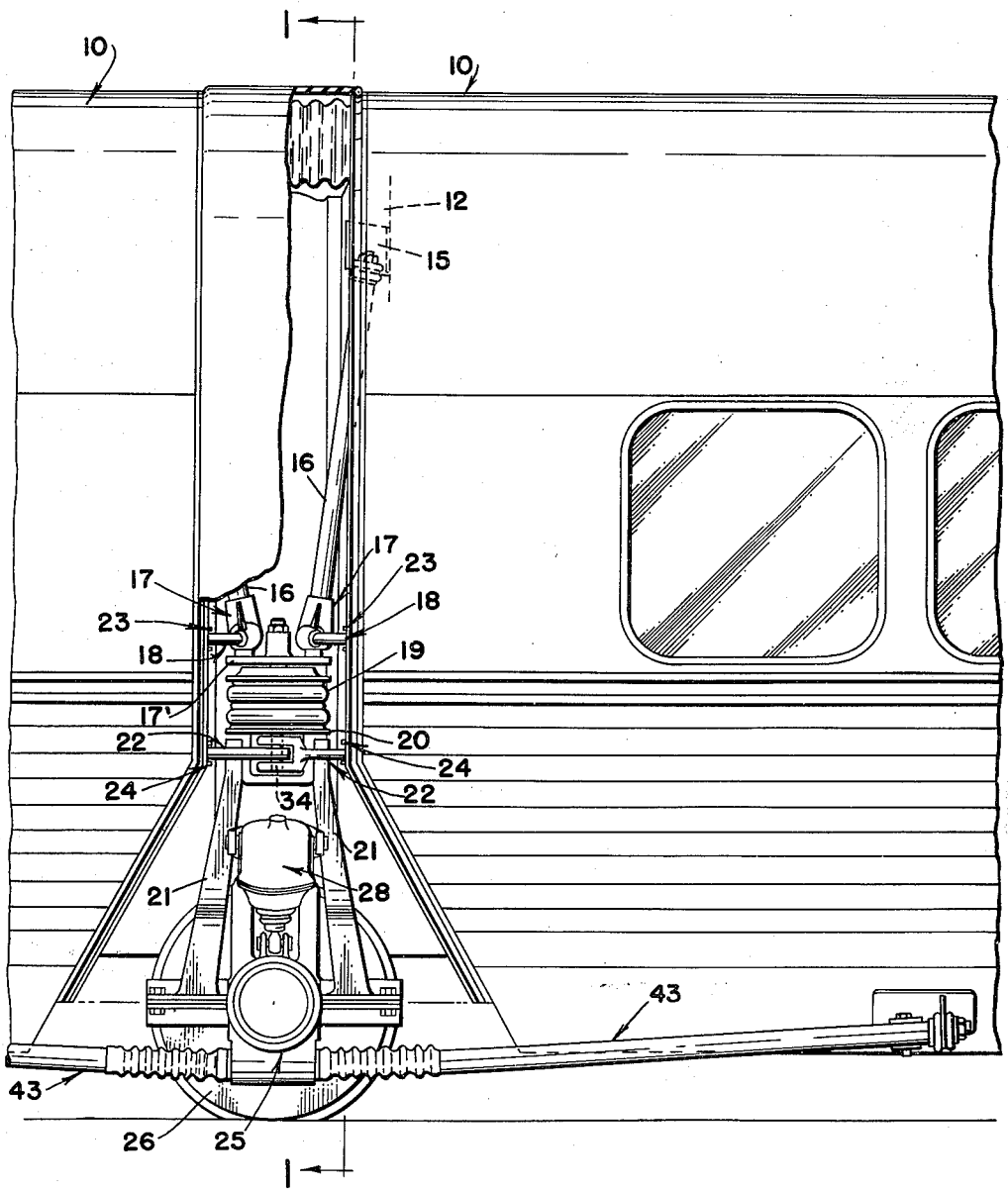
Fig. 2 is an elevational schematic cut-a-way side view of two articulated cars of a train, showing the suspension system and the radially guided axle system.

In the side view, Fig. 2, other details of the suspension system are disclosed. One of the pair of torsilastic arms, 21 is shown in said view. The bellows or springing means 19 appears as does the walking beam 17′, upper lateral link 18 and the vertical body strut 16, as it is attached to the vertical body strut mounting 15. Also appearing in this view are the upper lateral links shown generally at 18 and the lower lateral links shown generally at 22, which are attached to their brackets and which are respectively the upper lateral link mounting bracket 23 and the lower lateral link mounting bracket 24. Of course, in each instance there is an identical component on the opposite side of the assembly, as there are four vertical body struts, four upper lateral links, four lower lateral links and four torsilastic arms.

Figure 4:
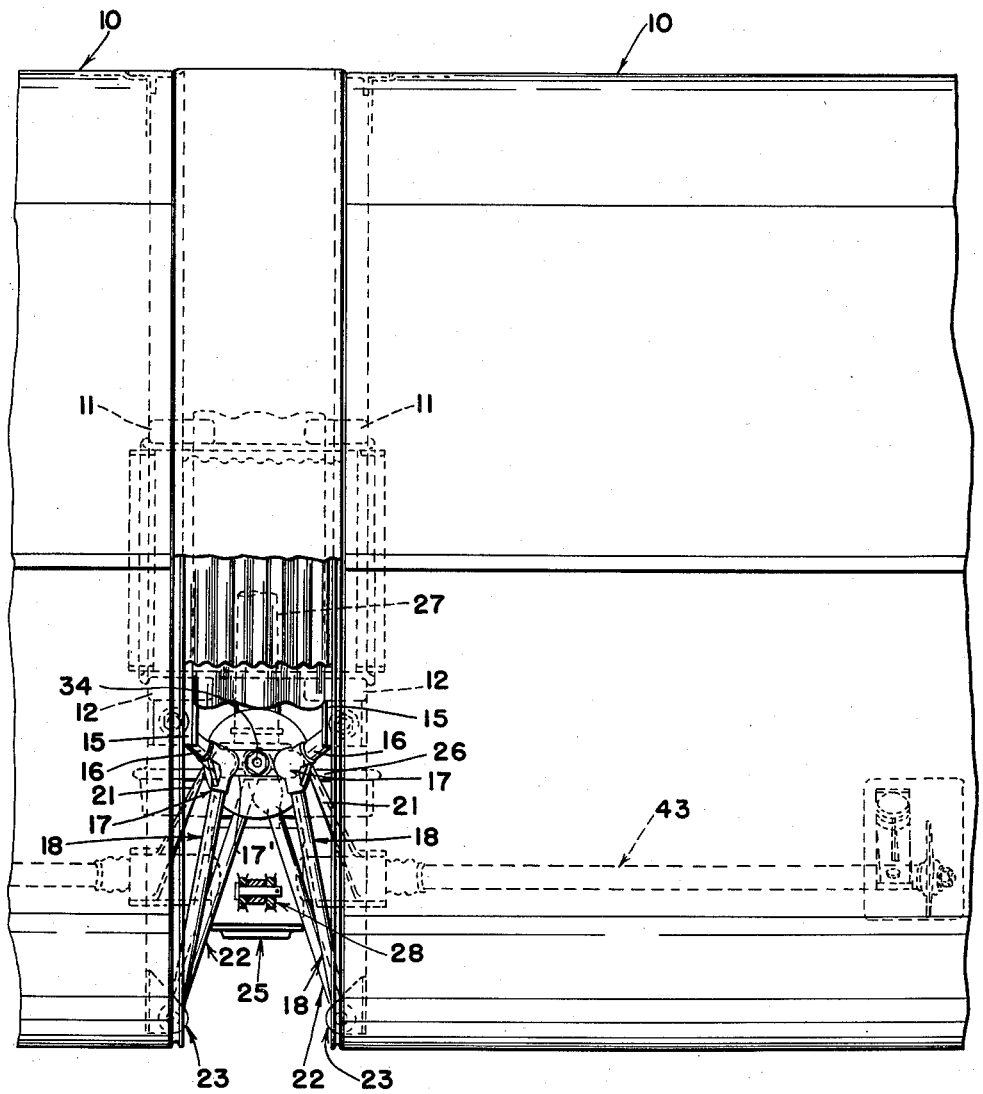
Fig. 4 is a top plan view of the suspension system with parts broken away.

In the top views, Figs. 4 and 5, it will be seen that the upper lateral links which are generally shown at 18 are attached to an off center position of the walking beam 17′, said positions being respectively for the two upper lateral links 18. This is also the point of contact for the support to the vertical body struts 16 shown in the drawing.

The top view, of course, foreshortens the length of the body strut. The lower lateral links 22 are connected to a common point on the mounting plate 20, this point being 34. These connections are, of course, pivotal connections generally with a metal rubber mounting permitting limited angular movement and adapted to absorb shock.

The connection for the lower lateral links 22 is shown more particularly in the side view of Fig. 2. It will be seen here that a forked construction is adapted for said links, one of the links being forked and the opposite link pivoting between said forked link. At the same time the torsilastic arms, one of which is designated 21, and there are two on either side of the unit, are adapted to be fastened to the mounting plate on the lower end of the bellows and to permit the bellows to move outwardly and inwardly relative to the rails upon movement around curves. This will be shown in the full roll position in Fig. 6. There is a restoring force in said torsilastic arms 21, so that when centrifugal force causing body roll in the cars is removed, the torsilastic arm will reposition the car to its original position. Under these conditions said torsilastic arms support the car well up, approximately in the region of the center of gravity, but effectively at the elastic center near the roof of the unit producing a pendulum effect.

Some of the parts of the assembly are much more clearly seen, and the action can be more clearly described in connection with the full roll position shown in Fig. 6. The car rolls about the roll center or elastic center 40 which is shown on the drawings as being between the crash posts and well up in the upper portion of the car body. Because of the centrifugal force in going around the curve, the body tends to rotate about the elastic center, and the torsilastic arms permit movement of the body a limited amount in the opposite direction to that of the curve. There will be seen to be a support for said car pivoted around two points, the upper ends of the torsilastic arms, 41 and 42, which are in vertical alignment when viewed from the side. These ends of the torsilastic arms being pivoted through the lower center of the air springs will work because of the geometry of the structure to support the car to the right of the curve, i.e., away from the direction of the curve, and this movement increases the effective resistance of the air bellows on the side away from the curve. The body at the same time is supported through the air bellows and the walking beam and by means of the vertical body struts well up on the car in a pendulum type support. The upper and lower lateral links position the car so that there is a wishbone action or the links pivot. At the same time the air springs and the mounting plates on either side bisect the angle between the cars.

Meanwhile, the axle is radially guided by an assembly not herein further described, but which is generally referred to as a drag link assembly 43, although other types of axle centering systems may be used. By this means the lower portion of the suspension is displaced an equal distance axially between the cars, irrespective of car body roll. This provides more comfortable riding for the passengers, who under normal circumstances would have no sensation of lateral force. It will further be seen that there is a greater amount of skew due to the different radii of the lateral links, and the right air bellows is displaced a greater amount from the line of centers passing through the walking beam than is the left air bellows. This increases the spring rate on the right spring on the outside of the curve.

At the same time this movement has been going on between the cars other movements, such as torsion, could well take place. For example, a low rail could set up another set of forces in the torsilastic arm 21 which, as soon as this was corrected, would reright that, but the flexible coupling between the car, permitting longitudinal pull, has a limited amount of freedom to permit movement of one car relative to another in torsion, as might happen with a low rail. This might be as much as 1½ inches at the roof of the car about a center which is the coupling. This is a metal rubber type coupling, permitting limited angular and torsional movement between the cars. The coupling will be further described in other views.

The condition in the full roll can be seen in the top view, schematically shown of the cars. In this view the upper lateral links generally shown at 18 move together on one side of the car, on the inside of the curve, whereas the same upper lateral links 18 on the opposite side of the car spread apart. The lower lateral links 22 operate similarly from slightly different points, and additional numerals on the drawing would only confuse the drawing, but it is sufficient to say that these and the upper lateral links are, in effect, equilateral triangles which keep the upper and lower end of the air spring positioned on the line bisecting the angle between the cars, and, of course, the axle centering system or drag link structure, as is particularly shown here, positions the lower portion of the suspension. The structure as shown is inherently capable of resisting all braking forces in the system.

It should be further explained that the third degree of freedom, which is torsion between the cars, is permitted through the coupler axis, and though this coupler will permit movement angularly, the remaining connections between the cars, through the air springs and the torsilastic arms must similarly provide for this movement. The mounting bracket or upper walking beam on top of the air bellows has sufficient freedom to accommodate a limited amount of twist. In the lower lateral links, because these are rubber joints, there would be some resiliency, and this would accommodate some of this twist. The maximum twist between the cars would be 1 inch to 1½ inches on the arc of a circle centered at the coupler, meaning that the one car would twist relative to another car on the roof line, about 1 inch to 1½ inches.

Figure 3:
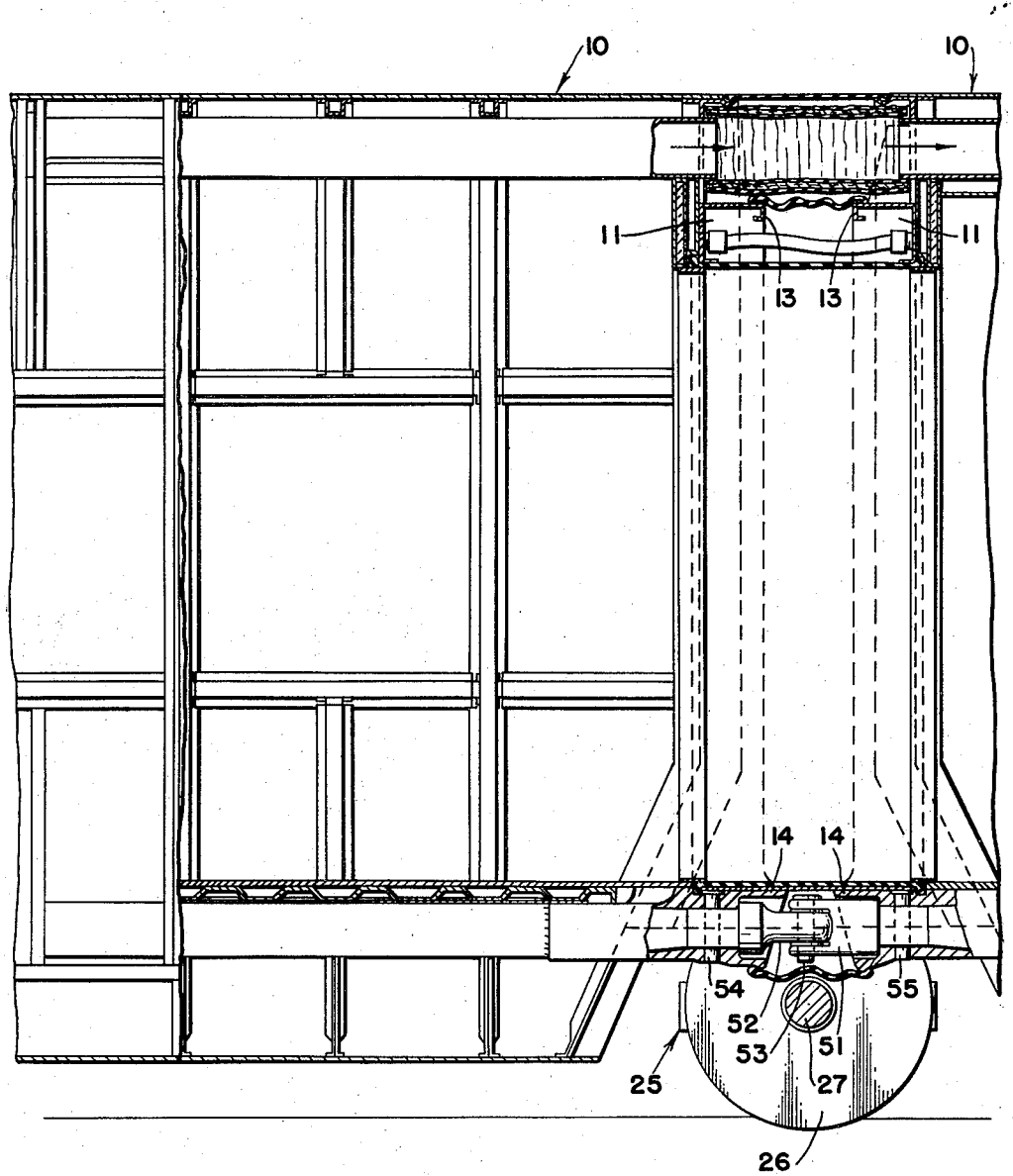
Fig. 3 is a cut-a-way side view of the coupled cars with the skin removed, showing the structural members and the linkage connection between the cars.
Figure 7:
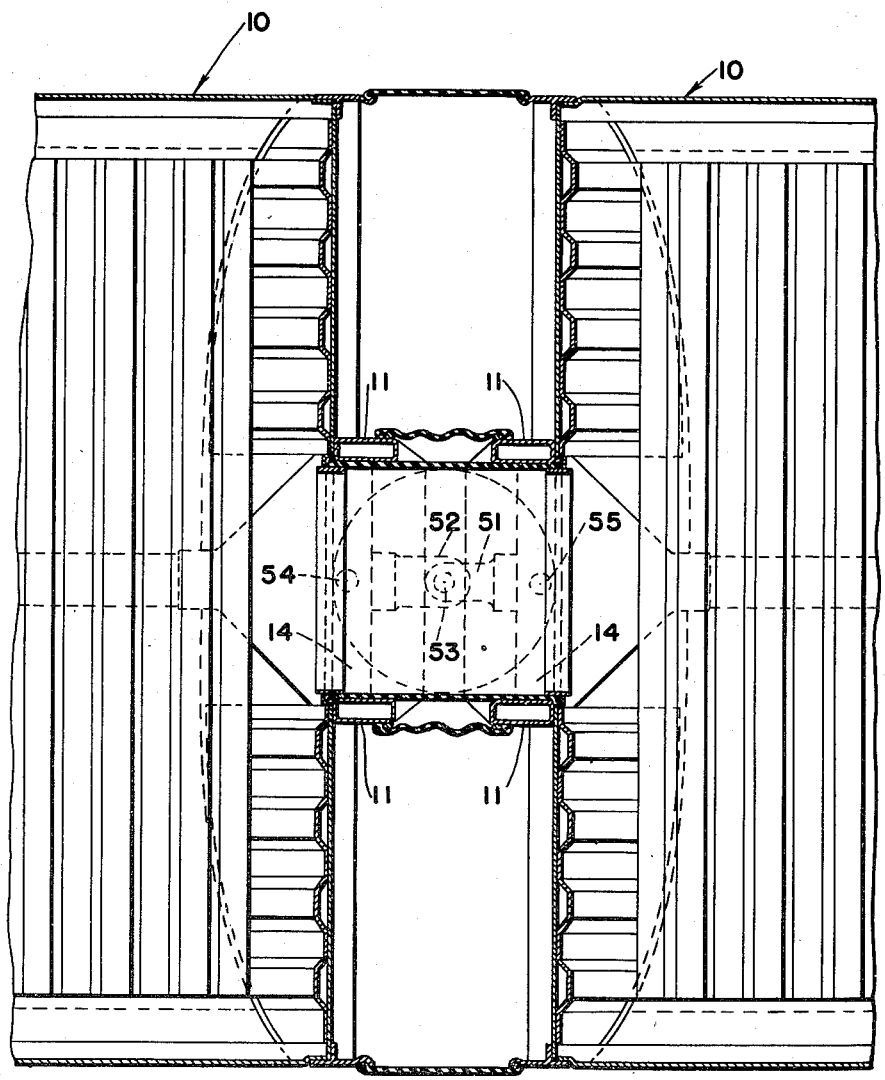
Fig. 7 is a top plan view in section of the coupled cars.

The coupler assembly is shown more particularly in Figs. 3, 5 and 7 and consists of a coupler assembly on either car, a female coupler member 51, a male coupler member 52 and a pivot pin therethrough shown at 53. Each of said coupler members, the male and female members, are connected to the coupler assembly by shear pins shown at 54 and 55. Resilient connections between 52 and 51 permit angular and torsional movement but no longitudinal movement in compression as coupler members 52 and 51 have mating spherical surfaces.

Said suspension system is particularly adapted for radially guided, single axle pendulum type supports for articulated trains, and is adapted by a series of vertical struts and lateral struts to be supported on the air bellows. The support is at or above the center of gravity, forming a pendulum type support in which the struts provide wishbone structures to keep the supporting system bisecting the angle between the cars, said connections being rubber mounted to permit a limited amount of torsion between the cars. The basic support is a plurality of torsilastic arms, pivoted perpendicular to the axle providing restoring forces in the torsilastic arms to support the bellows in the event the lateral forces are set up as when going around curves.

Further details of this system have been explained in connection with the operation of the particular parts. This invention may be embodied in other specific forms, without departing from the spirit or essential characteristics thereof. The present embodiments are, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

I claim:

1. In a suspension for articulated railway trains, a pair of adjacent cars, a single axle journalled at its ends and disposed between the opposed ends of said cars, wheels mounted on the axle adjacent the journals, torsilastic arms extending upwardly from the journals and pivotally mounted at their lower ends thereto, upwardly directed compression springing means pivotally mounted at their lower ends to the upper ends of the torsilastic arms, upwardly directed support members pivotally mounted at their lower ends to the upper ends of the springing means and at their upper ends to the cars, whereby a pendulum support is provided permitting a limited amount of freedom between the cars, said springing means, by reason of the pivotal connections at the opposite ends of the support members and torsilastic arms, being free to translate over limited distances laterally with respect to the vertical center lines of the cars.

2. A system as defined in claim 1 including a plurality of laterally extending links pivotally connected to said springing means and each of said cars in order to provide wishbone structures for guiding the movements of said springing means.

3. A system as defined in claim 1 in which said axle is located equidistant from the opposed ends of said adjacent cars and in which axle guiding means are provided for maintaining said axle along the bisector of any angle existing between said opposed ends.

4. A system as defined in claim 3 in which said springing means and the upper ends of said support members are disposed in substantial vertical alignment with said axle.

5. A system as defined in claim 3 in which said springing means are disposed in substantial vertical alignment with said axle, and further in which said springing means are disposed on a level in the vicinity of the level of the center of gravity of the cars.

References Cited in the file of this patent

UNITED STATES PATENTS

| | | |
|---|---|---|
| 2,047,336 | Stout | July 14, 1936 |
| 2,141,592 | Clar et al. | Dec. 27, 1938 |
| 2,217,033 | Van Dorn | Oct. 8, 1940 |
| 2,217,034 | Van Dorn | Oct. 8, 1940 |
| 2,225,242 | Van Dorn et al. | Dec. 17, 1940 |
| 2,252,789 | Van Dorn | Aug. 19, 1941 |
| 2,268,439 | Beebe | Dec. 30, 1941 |
| 2,601,928 | Walsh et al. | July 1, 1952 |
| 2,687,099 | MacVeigh | Aug. 24, 1954 |
| 2,746,399 | Tomas | May 22, 1956 |
| 2,839,010 | Harbulak | June 17, 1958 |
| 2,893,326 | Browne et al. | July 7, 1959 |

FOREIGN PATENTS

| | | |
|---|---|---|
| 157,620 | Australia | July 13, 1954 |
| 606,366 | France | Mar. 8, 1926 |
| 1,064,820 | France | Oct. 1, 1952 |
| 528,356 | Great Britain | Oct. 28, 1940 |